United States Patent [19]

Johnson et al.

[11] 4,342,166
[45] Aug. 3, 1982

[54] TOOL FASTENING

[75] Inventors: William M. Johnson; Alan Lindsay; Harry Klaassens, all of Maidstone, Australia

[73] Assignee: Ralph McKay Limited, Victoria, Australia

[21] Appl. No.: 168,746

[22] Filed: Jul. 14, 1980

[51] Int. Cl.³ ............................................. E02F 9/28
[52] U.S. Cl. .................................. 37/142 A; 299/92; 403/329; 172/711
[58] Field of Search ............. 37/80 A, 142 A, 191 R, 37/191 A; 299/92; 172/711, 705, 707–708; 403/329, 379, 108–109, 326–327, 341, 357, 397, 93; 24/201 R, 201 LP, 252 B, 3 J

[56] References Cited

U.S. PATENT DOCUMENTS

| 2,047,485 | 7/1936 | McBrady | 403/108 X |
| 2,484,401 | 10/1949 | Cole | 403/108 X |
| 3,188,756 | 6/1965 | Baer | 37/142 A |
| 3,606,471 | 9/1971 | Evans | 37/142 A |
| 3,832,077 | 8/1974 | Mehren | 403/379 |
| 4,181,230 | 1/1980 | Acuff | 403/329 X |

FOREIGN PATENT DOCUMENTS

| 2617954 | 10/1977 | Fed. Rep. of Germany | 299/92 |
| 1011165 | 11/1965 | United Kingdom | 299/92 |

*Primary Examiner*—E. H. Eickholt
*Attorney, Agent, or Firm*—Buell, Blenko, Ziesenheim & Beck

[57] ABSTRACT

A mounting bracket for fastening replaceable earth engaging tools such as rotary hoe blades or trench digger teeth in which the shaft of the tool fits within a recess in the bracket and a spring biased pin is arranged to pass through both the shaft and the bracket at right angles to the longitudinal dimension of the shaft. This arrangement does away with the need to use bolts.

3 Claims, 3 Drawing Figures

TOOL FASTENING

This invention relates to means for fastening earth engaging tools particularly those used with rotary hoes or trench diggers where the blades are carried on a chain.

Generally such earth engaging tools are simply bolted into position on the rotary plate or drive chain and consequently after use the bolts are covered in earth and become encrusted in position and are particularly difficult to remove. Thus the replacing of blades on such machines can become a major task.

It is an object of this invention to provide a simple means of fastening such tools to enable simple removal of the blades to be affected.

To this end the present invention provides a mounting bracket incorporating a recess which is adapted to receive the shaft of a tool said bracket and said tool shaft incorporating complementary holes which are aligned when said shaft is seated within said recess and a spring biased pin removably attached to said bracket, said pin being adapted to seat within said holes of said shaft and bracket.

The bracket of this invention can either be attachable to or form part of the chain or rotor plate of such machines as a trench digger or a rotary hoe.

A preferred embodiment of this invention will now be described.

The attached drawings illustrate a bracket which can be secured to a rotary hoe or to a chain of a trench digger or similar tool.

Figure 2:
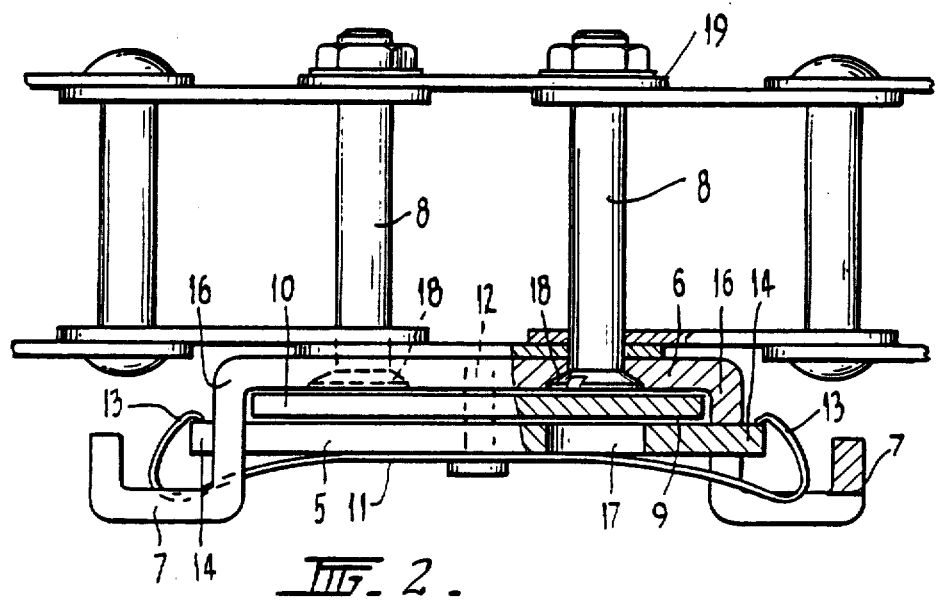
FIG. 2 is an end view of the bracket with the shaft of a tool secured in position onto a chain of a trench digger.

The bracket consists of a body portion 4 comprising two plates 5 and 6 which extend between the shoulders 7 of the bracket. Plate 5 includes access holes 17 for bolts 9 and plate 6 includes countersunk holes 18 for accepting the ends of the bolts 8. The bolts 8 are adapted to secure the bracket to a rotary plate of a rotary hoe or particularly to the chain 19 of a trench digger as shown in FIG. 2. Thus the plate 6 will abut the chain, and thus plate 5 is exposed. The recess 9 between plates 5 and 6 is complementary in shape to the shaft 10 of the digging tool. Movement of the chain 19 or rotary plate to which the bracket is attached is in the direction parallel to plates 5 and 6 and along the line 7—7.

The spring 11 and its attached pin 12 seat on to plate 5, where the curved ends 13 of the spring 11 snap over the flanges 14 of plate 5. Shaft 10 incorporates a hole which aligns with the hole 15 of plate 5 and pin 12 extends through hole 15 and the co-operating hole of shaft 10. The major stress forces to which shaft 10 is subjected are borne by the bracket walls 16 whereas pin 12 merely serves to retain the shaft 10 in position.

To remove shaft 10 the spring 11 is flexed to raise the pin 12 above the surface of shaft 10 and shaft 10 can then simply be pulled from recess 9. Assembly is equally simple. The shoulders 7 are shaped to surround the ends 13 of the spring 11 and serve to protect these ends 13 and prevent them being dislodged or broken. These protective shoulders 7 are not essential and in the case of rotary hoes the brackets may simply terminate in end wall 16 and end flanges 14.

The pin 12 of spring 11 need not be headed as shown but is preferably riveted to the spring 11.

Figure 1:
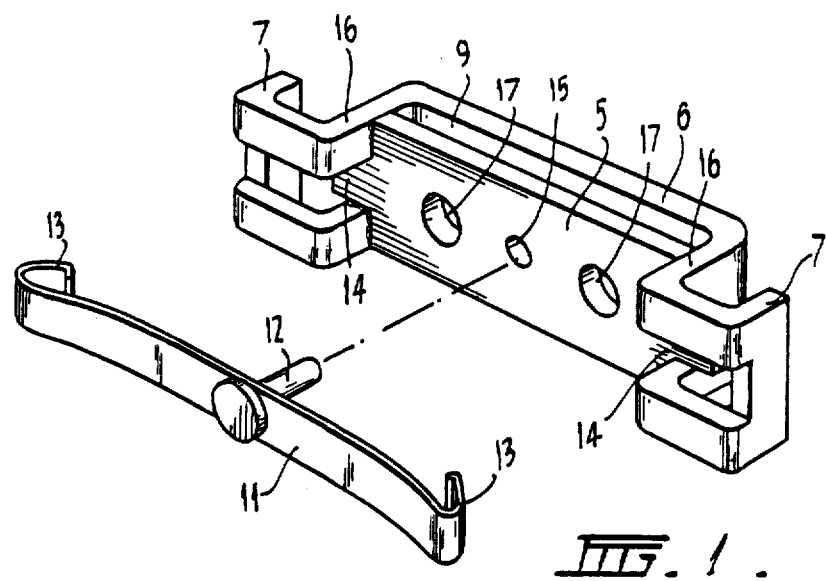
FIG. 1 is an exploded perspective view of the bracket.
Figure 3:
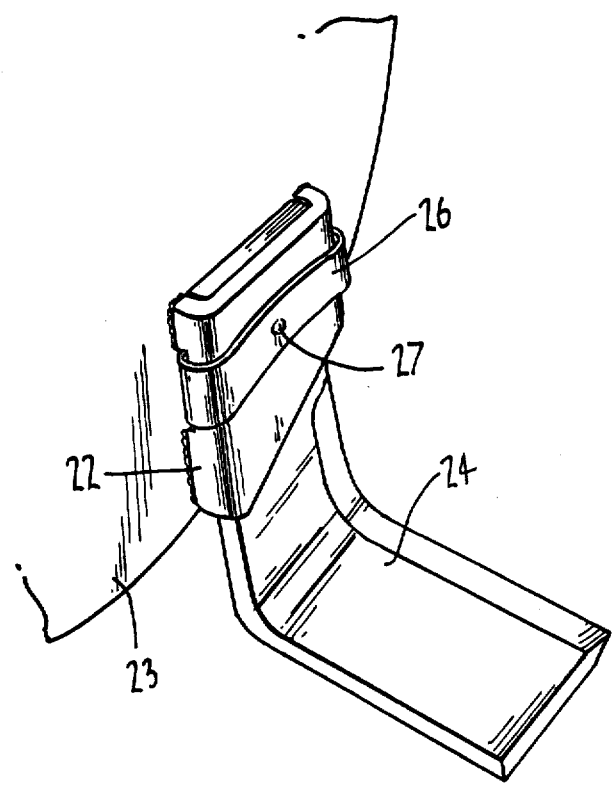
FIG. 3 is a view of the bracket of this invention fitted to a rotary hoe.

In FIG. 3 the bracket 22 is welded to a rotary wheel 23 of a rotary hoe. The hoe blade 24 is secured within bracket 22 by the same spring 26 and pin 27 arrangement as used in the embodiment of FIGS. 1 and 2. Once again the hoe blade can easily be removed in a much shorter time than was possible in the prior art.

From the above description it can be seen that the present invention provides a simle and convenient fastening means for earth engaging tools which reduces considerably the time required to replace such tools.

We claim:

1. A mounting bracket for an earth engaging tool comprising a body portion a recess within said body portion adapted to receive a complementary shaped shaft of an earth engaging tool a clip attachable externally to said body portion of said bracket by resilient end lugs and a retaining pin, secured to said clip intermediate said ends, said pin being adapted to seat within aligned holes of the tool shaft and said body portion when said tool and said bracket are assembled, to retain the shaft in said recess and in which the body portion incorporates shoulders adapted to protect the end lugs of said clip.

2. A rotary hoe wherein the rotary plate carries a plurality of mounting brackets as claimed in claim 1 carried by the rotary plate of a rotary hoe with each mounting bracket in turn supporting an earth engaging tool.

3. Trench digging apparatus which includes an endless chain having mounted thereon a plurality of mounting brackets as claimed in claim 1 each said mounting bracket supporting an earth engaging tool.

* * * * *

UNITED STATES PATENT AND TRADEMARK OFFICE
CERTIFICATE OF CORRECTION

PATENT NO. : 4,342,166
DATED : August 3, 1982
INVENTOR(S) : WILLIAM M. JOHNSON, ALAN LINDSAY and HARRY KLAASSENS It is certified that error appears in the above-identified patent and that said Letters Patent are hereby corrected as shown below:

Column 1, line 43, "bolts 9" should read --bolts 8--.

Column 2, line 27, "simle" should be --simple--.

Signed and Sealed this

Twelfth Day of October 1982

[SEAL]

Attest:

GERALD J. MOSSINGHOFF

Attesting Officer     Commissioner of Patents and Trademarks